(12) United States Patent
Vaughn (10) Patent No.: US 10,986,808 B1
(45) Date of Patent: Apr. 27, 2021

(54) DEVICE FOR LOADING ELEVATED WILDLIFE FEEDER

(71) Applicant: Bruce Vaughn, O'Donnell, TX (US)

(72) Inventor: Bruce Vaughn, O'Donnell, TX (US)

( * ) Notice: Subject to any disclaimer, the term of this patent is extended or adjusted under 35 U.S.C. 154(b) by 205 days.

(21) Appl. No.: 16/249,152

(22) Filed: Jan. 16, 2019

(51) Int. Cl.
*A01K 5/02* (2006.01)
*A01M 31/00* (2006.01)

(52) U.S. Cl.
CPC ............. *A01K 5/02* (2013.01); *A01M 31/008* (2013.01)

(58) Field of Classification Search
CPC ........ A01K 5/02; A01M 31/008; A01C 7/102; A01C 15/006; A01C 15/04; A01C 15/12; A01C 7/082; B65G 2201/042; B65G 53/04; B65D 88/548; B22F 2999/00; B22F 2003/1056; B22F 2202/01; B22F 3/004; B22F 3/008; B22F 3/1055
See application file for complete search history.

(56) References Cited

U.S. PATENT DOCUMENTS

| | | | |
|---|---|---|---|
| 1,844,065 A | 2/1932 | Heintz et al. | |
| 2,810,467 A * | 10/1957 | Bogaty | B65G 15/44 198/533 |
| 4,846,608 A * | 7/1989 | Sanders | B65G 53/14 406/144 |
| 5,209,608 A | 5/1993 | Edwards | |
| 5,570,547 A * | 11/1996 | Webb | B65D 88/08 220/247 |
| 2002/0185075 A1 | 12/2002 | Glover et al. | |
| 2003/0002926 A1 | 1/2003 | Webb | |
| 2007/0039553 A1 | 2/2007 | Friesenhahn et al. | |
| 2008/0087223 A1 | 4/2008 | Morris | |
| 2009/0202311 A1 * | 8/2009 | Deal | E21B 21/062 406/41 |
| 2013/0269621 A1 | 10/2013 | Moore | |
| 2016/0297625 A1 * | 10/2016 | Zinski | B29C 48/92 |
| 2017/0190523 A1 * | 7/2017 | Oren | B65G 53/26 |

FOREIGN PATENT DOCUMENTS

FR 2546143 A1 11/1984

OTHER PUBLICATIONS

Abbasi, T., & Abbasi, S. A. Dust explosions Cases, causes, consequences, and control. Journal of hazardous materials.[online], (2006) [retrieved on Oct. 1, 2020], Retrieved from the Internet:< URL:https://pdf.sciencedirectassets.com/271390/1-s2.0-S0304389407X02930/1-s2.0-S0304389406013604/main.pdf (Year: 2006).*

* cited by examiner

*Primary Examiner* — Timothy D Collins
*Assistant Examiner* — Brittany A Lowery
(74) *Attorney, Agent, or Firm* — James E. Walton (57) ABSTRACT

An assembly for easily filling an elevated wildlife feeder. The filler assembly has a hopper and a blower connected to a junction, the hopper, blower, and junction being supported by a base. The junction connects to a fixed feed pipe. A translating feed pipe connects to and slides along the fixed feed pipe. An air diffuser connects to the translating feed pipe, the diffuser being positioned above the feeder. The translating feed pipe is supported by a folding telescoping leg and by a hook that hooks upon the feeder. The feeder has a lifting rotating lid assembly. The lid assembly is useful upon feeders of various sizes. The lid is supported by a framework and is secured by a chain and hooked spring. Alternatively to the base, the filler assembly may be supported by a framework rotatably mounted to a trailer. The filler assembly rotates on the trailer.

17 Claims, 10 Drawing Sheets

DEVICE FOR LOADING ELEVATED WILDLIFE FEEDER

BACKGROUND

1. Field of the Invention

The present invention relates generally to improvements in systems for loading grains and feed materials, and more specifically to systems for loading grains and feed materials into elevated wildlife feeders.

2. Description of Related Art

Wild game management and hunting often requires the use of feeders for spreading corn, protein pellets, and/or other feed grains around an area for wildlife to consume. There are a variety of feeders presently available for purchase. Hunters, in particular, often use a type of feeder that includes an elevated drum or other container that is filled with corn and, at specific times, dispenses the corn over the ground around the feeder. These feeders are very common, however these feeders can be challenging to load with corn or other feed due to their elevation above the ground, as such feed usually comes in 40-50 pound bags. Usually, a user must carry a ladder for accessing the top of the feeder, or must otherwise stand on some piece of equipment.

There are options available for loading elevated wildlife feeders presently available in the market, however these options generally suffer from problems that reduce their effectiveness. For example, available feeder loaders may spill feed, may deposit the feed into the feeder so forcefully that a certain amount of feed and dust is ejected from the feeder, may be slow, or may not be well suited to uneven terrain. Furthermore, even if a system is used for easy loading of corn or feed grain into an elevated wildlife feeder, the feeder may still require a user to climb a ladder or other structure to remove the lid of the feeder. In addition, while a feeder filler system may be well suited to being used to fill several separate feeders over a common area of land, there exist challenges with transporting the filler system from feeder to feeder.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, combinations, and alternatives falling within the spirit and scope of the present application as defined by the appended claims.

DETAILED DESCRIPTION OF THE PREFERRED EMBODIMENT

Illustrative embodiments of the filler system for an elevated wildlife feeder according to the present application are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
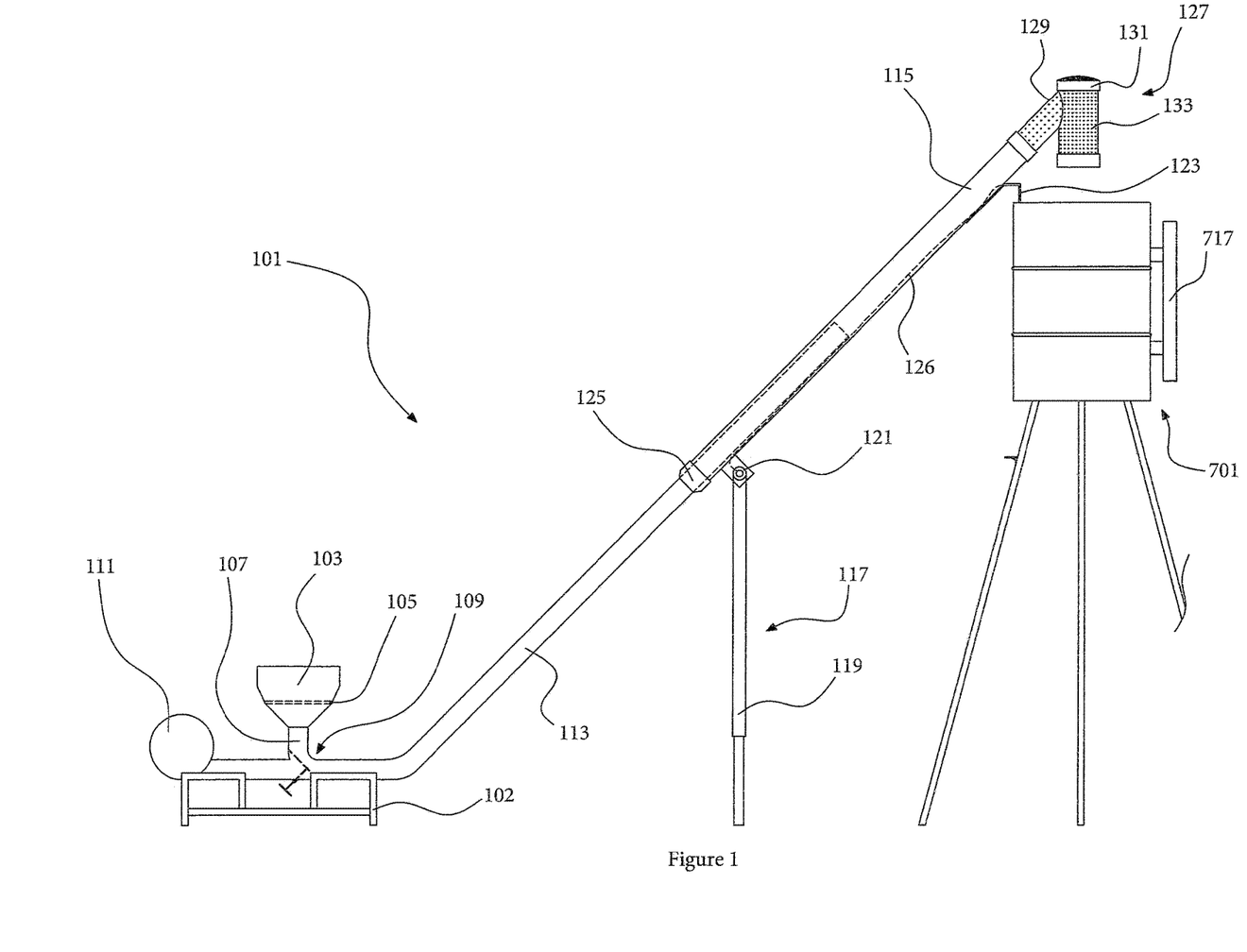
FIG. 1 is a view of a feeder filler system and associated feeder according to the preferred embodiment of the present application.
Figure 7A:
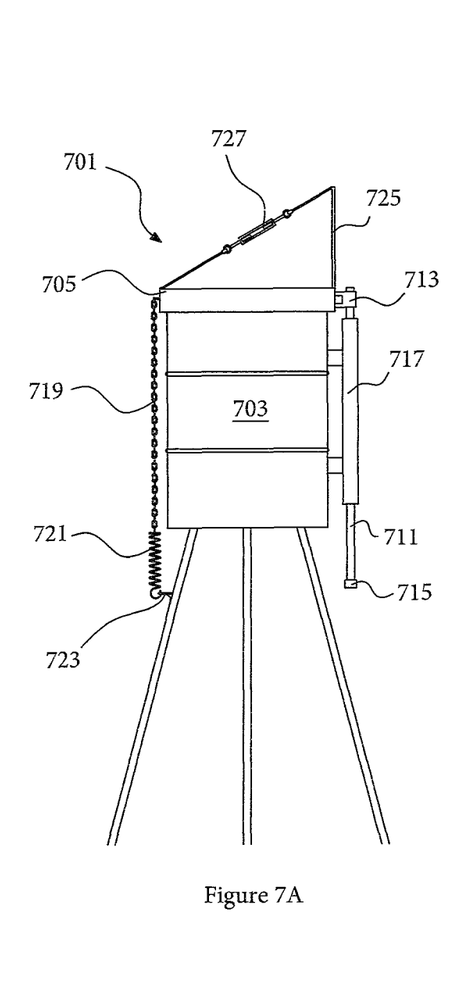
FIGS. 7A and 7B are side views of a feeder and lid feature according to the preferred embodiment of the present application, with the lower portions of the feeder omitted for clarity.
Figure 7B:
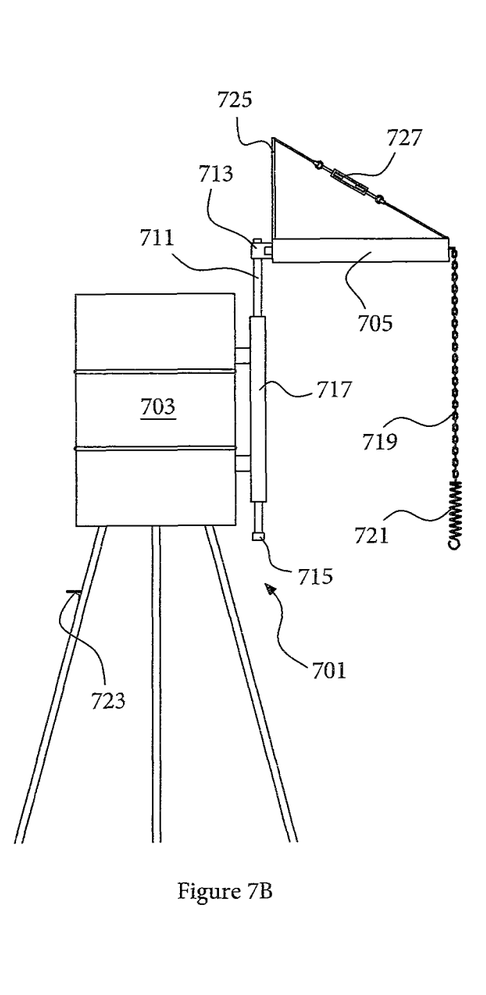
Figure 7C:
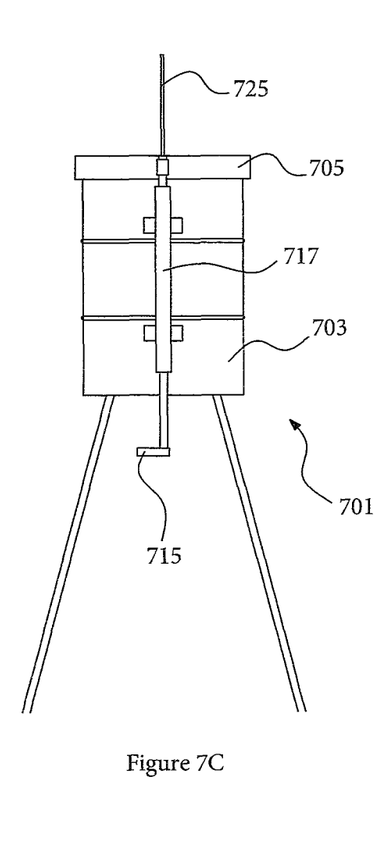
FIG. 7C is a rear view of the feeder and lid shown in FIGS. 7A and 7B.
Figure 8:
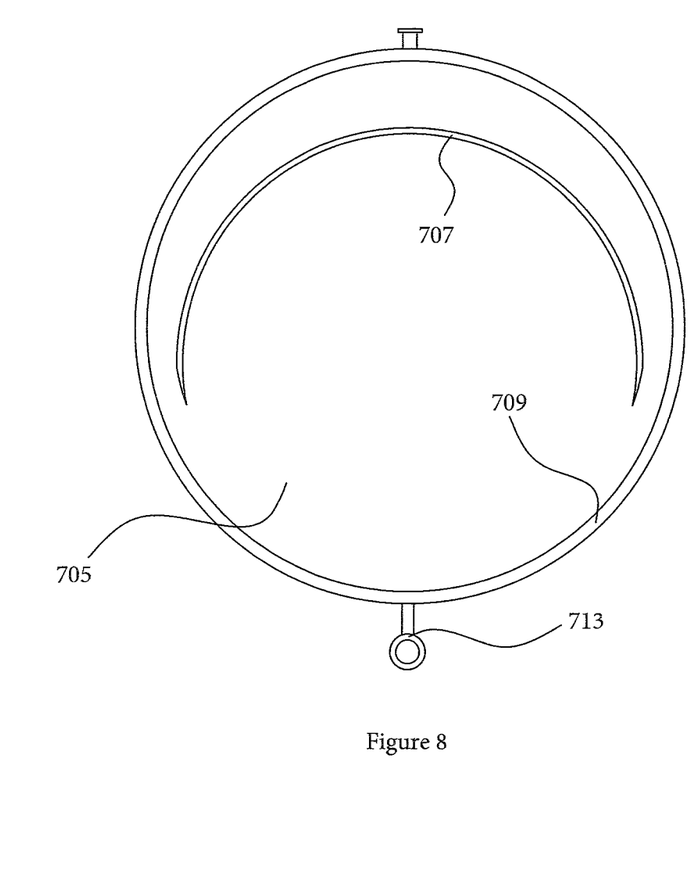
FIG. 8 is a bottom view of the lid feature according to FIGS. 7A-7C.

Referring now to FIG. 1 in the drawings, a filler system 101 for filling an elevated wildlife feeder 701 is shown (see also FIG. 7A-8). Certain features of feeder 701 are not shown for clarity in FIG. 1. Filler 101 preferably generally comprises a base 102, a hopper 103, a base junction 107, a blower 111, a feed pipe having a fixed feed pipe section 113 and a telescoping feed pipe section 115, and an air diffuser 127. It will be appreciated that feed pipe 113, 115 may be formed of a single integral pipe. Base 102 supports hopper 103, blower 111, and base junction 107. Base junction 107 is coupled to a lower end of fixed feed pipe section 113, which is coupled to telescoping feed pipe section 115, which is coupled at and upper end of telescoping feed pipe section 115 to diffuser 127. In use, corn, protein pellets, or other wildlife feed is loaded into hopper 103 and falls through screen 105 into base junction 107 where air from blower 111 forces the corn through feed pipes 113 and 115 into diffuser 127, at which point the corn is deposited into an elevated wildlife feeder, such as feeder 701 or any other commercially available elevated wildlife feeder. Although feed pipe 113, 115 is described herein as "telescoping," it will be appreciated that feed pipe may be extendable in other forms, such as interchangeable sections, coiled tubing, folded tubing, expandable tubing, etc.

As shown, filler system 101 is supported by base 102. Base 102 is preferably a simple framework base that rigidly supports hopper 103, blower 111, and base junction 107. Alternative embodiments may utilize a hopper pivotally mounted within base 10,2 so that hopper 103 adjusts and levels itself on sloped or rough terrain. Blower 111 in such an alternate embodiment may also be adjustably mounted within base 102 to account for rough or sloped terrain, or may be rigidly mounted to base 102 and may be connected to junction 107 by a flexible tube. Base 102 may have a variety of base pads or feet to securely hold base 102 in place on various terrains. For example, base 102 may have simply have flat-edged feet as shown in FIG. 1, or may have feet with sharp protrusions (not shown) that dig into the surface of the ground when base 102 is in use, such that base 102 is held in place. Though shown as a generally rectangular framework, base 102 should be understood to include any design, shape, or size suitable for supported the rest of filler system 101.

Hopper 103 is preferably a hollow bin or container made of a durable and relatively lightweight and inexpensive material such as polymer, aluminum, or steel, though other materials and designs could be used. Hopper 103 preferably houses a screen 105 that contains apertures sized such that screen 105 filters out larger particulates or foreign items that should not be sent through filler 101, but allows corn or other wildlife feed to pass through into base junction 107. Screen 105 may also be designed such that it effectively sifts corn, grain, or other wildlife feed deposited into hopper 103 so that the corn, grain, or feed passes more smoothly through filler 101. Screen 105 preferably is removable from hopper 103 and may be attached to the interior of hopper 103 in a variety of ways, such as simply resting on a lip formed in hopper 103, or being secured by fasteners such as screws or bolts. As seen in FIG. 1, hopper 103 is supported on top of base junction 107. In alternate embodiments, the hopper may include a cutoff valve (not shown) at its lower end that prevents corn, grain, or feed from falling into junction 107 until a user opens the cutoff valve. Hopper 103 may be an open-top design as shown, but may also include a lid (not shown). Such a lid may be a separate lid completely removable from hopper 103, or may be attached to hopper 103 by hinges or other hardware that allows the lid to open and close while still being attached to hopper 103.

Corn, grain, or feed that falls from hopper 103 into junction 107 is forced through filler system 101 by blower 111. Blower 111 is preferably an electrically-powered blower that may be powered from a variety of electrical sources such as a vehicle battery, portable generator, or vehicle-mounted transformer, and preferably includes a power cable for attaching to such power sources (not shown). Alternate embodiments of blower 111 may be powered by a dedicated battery pack mounted to filler system 101, or may be powered by combustible fuels such as gasoline, diesel, or propane. A preferred blower 111 has an exit air speed of roughly 240 miles-per-hour and a volumetric flow rate of roughly 380 cubic-feet-per-minute at the exit of blower 111. Other embodiments of blower 111, whether powered electrically or by fuel, may supply air at different speeds and rates as required for the function of filler system 101 and as best suited to the physical designs and limitations of filler system 101.

Referring now also to FIGS. 2A-3B, air supplied by blower 111 meets with corn, grain, or feed falling from hopper 103 in base junction 107. Base junction 107 preferably is a "sanitary-T-type" T-junction comprised of pipe having a circular cross-section (see FIG. 2C). Other embodiments of base junction 107 may utilize pipes of different geometries and cross sections. For example, FIG. 3C shows a junction 301 that is a Y-junction formed of pipes with a circular-cross section. Other cross-sectional shapes, such as rectangular, could be used; however, circular cross-sections are preferred for smoother and more consistent movement of corn, grain, or feed through filler system 101. As the corn, grain, or feed falls down into base junction 107, it meets with the airflow from blower 111. The airflow is indicated by arrow 217 (see FIG. 2A).

Figure 2A:
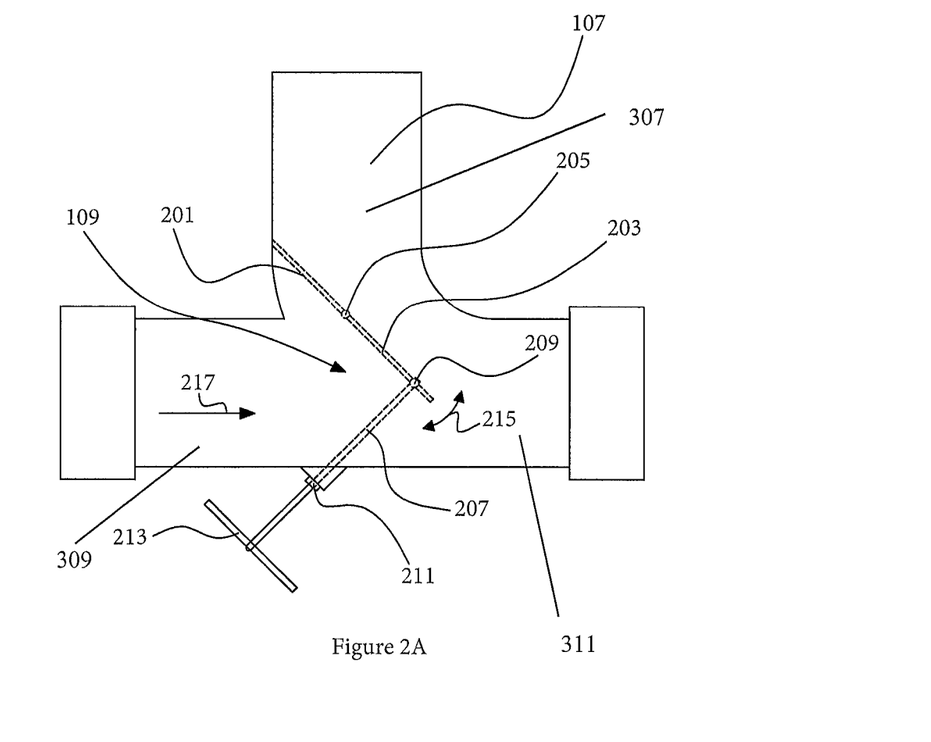
FIGS. 2A and 2B are enlarged views of a base junction and adjustable airflow damper according to the preferred embodiment of the present application.
Figure 2B:
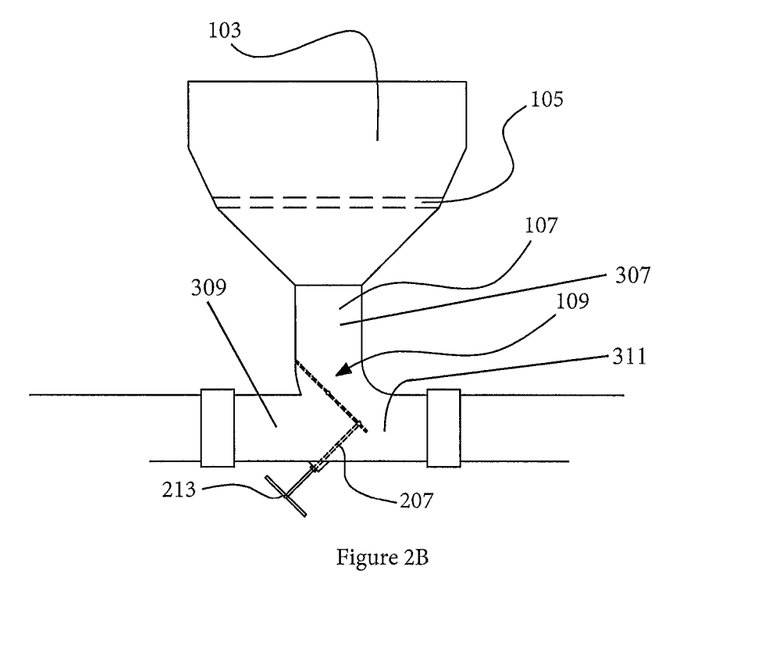
Figure 2C:
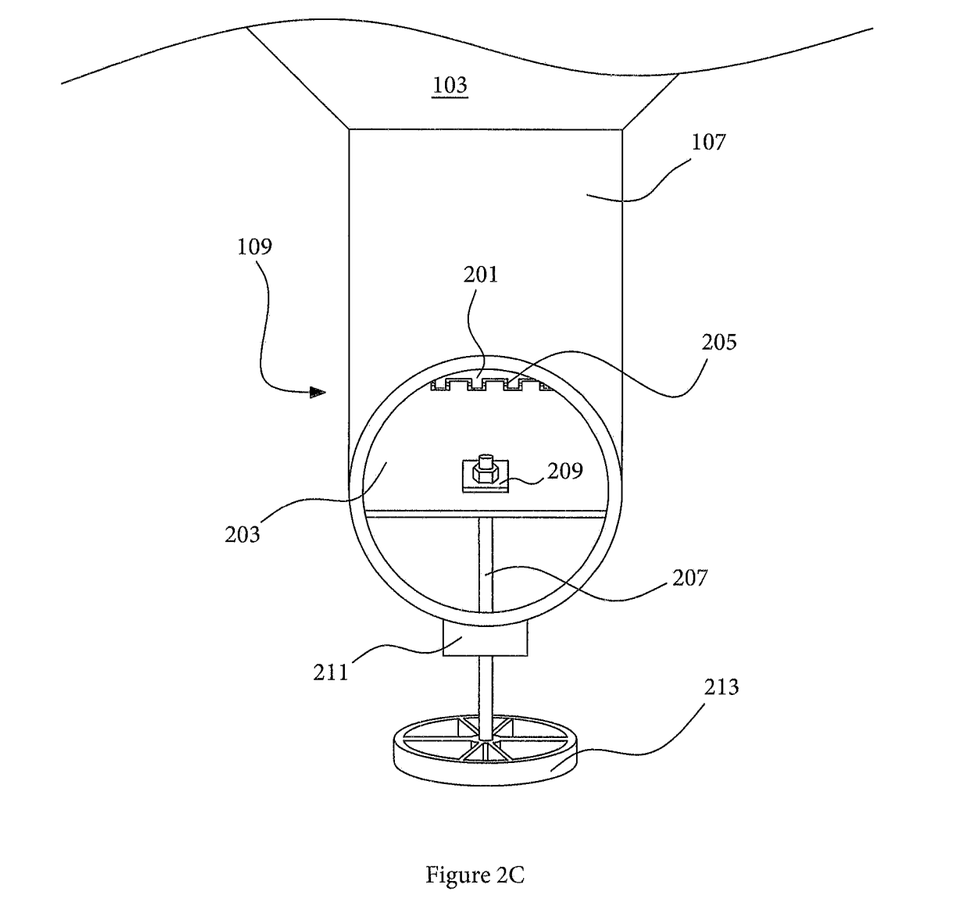
FIG. 2C is a view of the adjustable airflow damper through the interior of the base junction in FIGS. 2A and 2B.
Figure 3A:
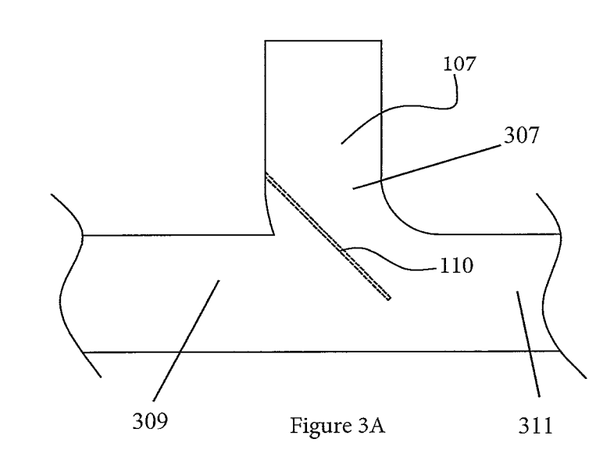
FIGS. 3A and 3B are enlarged views of the base junction of FIGS. 2A-2C with an alternated embodiment an airflow damper.
Figure 3B:
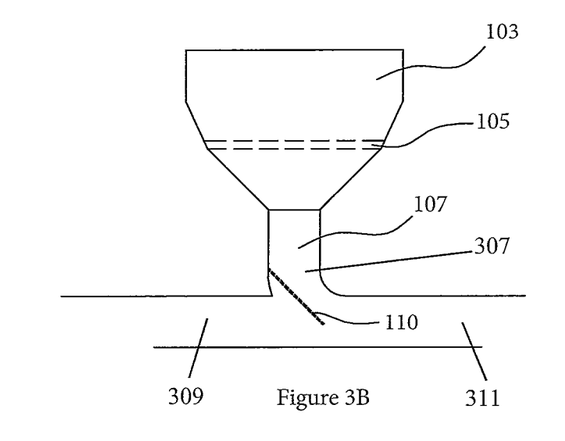

Base junction 107 may be a distinct junction separate from the other components of filler system 101, or may be an integral piece of fixed feed pipe 113. For example, FIGS. 1 and 2A-2C show base junction 107 as a separate distinct piece, and FIGS. 3A and 3B show base junction 107 as a continuous piece that is part of fixed feed pipe 113. Base junction 107, whether a distinct junction or a continuous piece of feed pipe 113, should be understood to generally have a first input port 307, a second input port 309, and an output port 311. The first input port 307 of junction 107 is the generally upright pipe portion that attaches to hopper 103. The second input port 309 of junction 107 is the generally horizontal portion that is connected to blower 111, either directly or via an intermediate pipe segment. The output port 311 of base junction 107 is the generally horizontal portion that connects, either distinctly or integrally, to fixed feed pipe 113. Base junction 107 therefore should be understood to have corn, grain, or feed input from hopper 103 through the first input port 307, to have air input from blower 111 through the second input port 309, and to expel the mixture of air and feed through the output port 311.

Base junction 107 may connect to hopper 103, blower 111, and fixed feed pipe 113 in a variety of ways. Base junction 107 may couple directly to hopper 103, blower 111, and fixed feed pipe 113 or may be connected via intermediate lengths of pipe between base junction 107 and the other components. Base junction 107 may be coupled to the various components in a variety of ways. For example, base junction 107 may be threadingly coupled to hopper 103, blower 111, and feed pipe 113, or the components may press fit together with base junction 107, with or without adhesives. Base junction 107, as well as the other components, may have flanged ends that couple together with clamps, bolts, or other fasteners. Alternatively, base junction 107 may be permanently attached to, and effectively made integral with, not only fixed feed pipe 113, but also with hopper 103 and blower 111, by permanent attachment means such as permanent adhesive or welding.

Base junction 107 preferably contains an airflow damper 109. Referring now specifically to FIGS. 2A-2C, damper 109 consists of a rigid member 201, also referred to herein as a fixed portion 201, and an adjustable member 203, also referred to herein as adjusting portion 203. Damper 109 is disposed at least partially within base junction 107. Fixed portions 201 and adjusting portion 203 are planar members disposed within base junction 107 and are shaped to conform to the inner dimensions of base junction 107. For example, FIG. 2C shows a view through base junction 107 back towards blower 111 (now shown). Because junction 107 is preferably formed of pipes having circular-cross sections, fixed portion 201 and adjusting portion 203 are contoured to the inner curved edges of base junction 107. Fixed portion 201, because it is directly mounted to the inside edges of base junction 107, conforms directly to the inner surfaces of base junction 107. Adjusting portion 203, because it pivots within base junction 107, may be shaped and sized in any way that allows adjusting portion 203 to pivot within base junction 107 without interference while maintaining as small of a gap between the outer edge of portion 203 and the inner surface of base junction 107 as possible. The smaller the gap between the surfaces of portion 203 and base junction 107, the greater the volume of airflow forced underneath adjusting portion 203, rather than between the sides of portion 203 and base junction 107.

Adjusting portion 203 is pivotally attached to fixed portion 201 by a hinge 205 and pivots about hinge 205 with respect to fixed portion 201. The movement of adjusting portion 203 about hinge 205 is indicated by arrow 215 in FIG. 2A. Fixed portion 201 preferably is at an angle roughly 40 degrees from vertical, but can be oriented at any angle useful for proper functioning within filler system 101. As illustrated in FIGS. 2A-2C, portions 201 and 203 are in an "inline" position wherein adjusting portion 203 is in line and coplanar with fixed portion 201. The inline position is effectively a general equilibrium position that enables airflow damper 109 to perform its functions as described below. However, adjustment may be actively made to airflow damper 109 to fine tune the performance of filler system 101 and the movement of corn, grain, or feed through filler system 101.

To allow for fine tuning of the airflow within base junction 107 and the movement of corn, grain, or feed through base junction 107, damper 109 is adjustable. As shown in FIGS. 2A-2C, an adjustment rod 207 is attached to adjusting portion 203 at pivot 209. Pivot 209 preferably is an aperture formed in adjusting member 203 through which a first end of adjustment rod 207 passes. Pivot 209 contains a nut and washer, a clip, or some other type of fastener to retain the first end of adjustment rod 207 within pivot 209. Adjustment rod 207 also extends from within base junction 107 through the surface of base junction 107 at pivot 211. Adjustment rod 207 preferably is an at-least-partially threaded member fixed that freely rotates within pivot 209 and threadingly engages pivot 211. Rod 207 threadingly engages pivot 211 via a threaded nut or other member pivotally mounted within pivot 211 such that, as the threaded adjustment rod 207 turns within pivots 211 and 209, rod 207 translates with respect to base junction 107. Adjusting rod 207 preferably supports a handle 213 at a second end of rod 207 to enable easier manipulation and turning of adjusting rod 207. Alternatively, adjusting rod 207 may not have a handle and may instead simply have a nut, slot, or other feature formed at its second end such that a user would use a tool like a wrench or screwdriver to turn adjusting rod 207.

Depending upon the direction of rotation and the pitch of the threads on threaded adjustment rod 207, adjusting portion 203 at pivot 209 is pulled toward pivot 211 or pushed away from pivot 211, thereby rotating adjusting portion 203 about, hinge 205 with respect to fixed portion 201. As adjusting portion 203 pivots towards pivot 211 as a result of the translation of adjustment rod 207, rod 207 tilts farther upward, thereby increasing the angle between rod 207 and adjusting member 203. As adjusting portion 203 pivots away from pivot 211, adjustment rod 207 tilts farther downward, thereby decreasing the angle between rod 207 and adjusting member 203. The aperture of pivot 209 through which adjusting rod 207 passes is shaped such that the first end of adjusting rod 207 may accordingly tilt within pivot 209, and the aperture preferably contains a certain amount of clearance such that adjusting rod 207 may slightly translate up and down along the length of adjusting member 203.

Referring now also to FIGS. 3A and 3B, depending upon the design objectives for filler system 101 such as size, complexity, or cost, an adjustable airflow damper 109 may not be necessary or desired to enable improved loading and smoother travel of corn, grain, or feed through system 101. In such circumstances, base junction 107 may contain a fixed airflow damper 110 that is a single rigid piece held within base junction 107. Fixed damper 110 preferably is a planar member supported at an angle of about 40 degrees away from vertical and conforming to the inner surfaces of junction 107. Aside from the lack of adjustability, damper 110 otherwise performs the same as or substantially similarly to adjustable damper 109 in constricting the airflow from blower 111 and directing the corn, grain, or feed into the airflow.

The effect of airflow damper 109, and of airflow damper 110, is to constrict the cross-sectional area of the airflow path from blower 111 at the end of adjusting portion 203, while maintaining the volumetric flow rate of the forced air from blower 111, thereby increasing the airspeed of the forced air at the lower edge of adjusting portion 203 (the airflow from blower 111 is indicated by arrow 217 in FIG. 2A). As the airflow from blower 111 is constricted by damper 109 or 110, corn, grain, or feed is being dropped into base junction 107 from hopper 103, and the corn or grain slides down the top surface of damper 109 or 110 into the lower area of base junction 107. The increased airspeed of the forced air at the lower edge of adjusting portion 203 helps accelerate the corn or feed grain through the remaining portions of filler system 101 more effectively than forced air without the damper would accelerate the corn through the system. Adjustment of adjusting portion 203 by the rotating of adjusting member 207 enables a user to increase or decrease the cross-sectional area of the airflow path from blower 111.

Furthermore, the downward slope of damper 109 or 110 helps initiate forward movement of the corn, grain, or feed such that the corn, grain, or feed is already moving forward when it is introduced into the airflow from blower 111, thereby facilitating even smoother and more reliable movement of corn, grain, or feed into the airflow of blower 11 and through the remainder of filler system 101. Finally, by being angled as shown in FIGS. 2A and 2B, damper 109 substantially limits or obstructs any airflow that would otherwise be directed upward through base junction 107 into hopper 103, thereby preventing corn, grain, or dust blowback towards a user filling hopper 103.

Figure 3C:
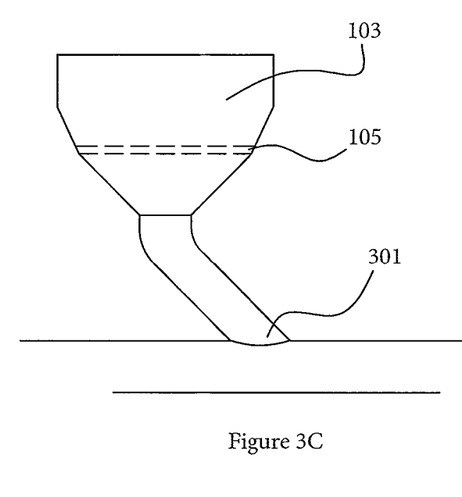
FIG. 3C is an enlarged view of an alternate embodiment of the base junction from FIGS. 2A-3B.

Referring now also to FIG. 3C, an alternative embodiment of base junction 107 is illustrated. IN this embodiment, a damper is not utilized. Junction 301 is a "sanitary-type" Y-junction without a damper. Because there is no damper, the airflow is not accelerated at the point where corn, grain, or feed is introduced into the airflow. However, because junction 301 is a Y-junction as shown, junction 301 does contain a sloped inner surface between hopper 103 and the point of introduction to airflow such that the corn, grain, or feed is already moving partially in the direction of the airflow when it is introduced into the airflow. Furthermore, because the angled upper portion of junction 301 angles way from the airflow, junction 301 may also prevent corn, grain, feed, or dust blowback through junction 301 towards a user filling hopper 103.

Referring again to FIG. 1, corn, grain, or feed supplied to hopper 103 is blown through junction 107 into fixed feed pipe 113. As shown, base junction 107 is an integral formed portion of fixed feed pipe 113. However, base junction 107 should be understood to include both integral and separate junctions, and the specific implementation of an integral or distinct base junction 107 depends upon the preferences of the user or producer. Fixed feed pipe 113 preferably has a curve formed in it with an angle of roughly 45 degrees. This curve begins pushing the corn or feed grain upwards through filler system 101 towards an elevated feeder such as, for example, elevated feeder 701. After traveling through fixed pipe 113, the corn or feed grain enters telescoping feed pipe 115.

Figure 4A:
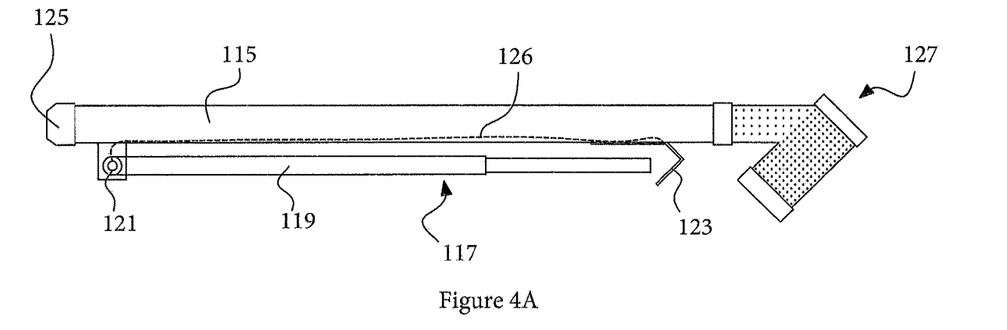
FIGS. 4A and 4B are enlarged views of a folding pipe support feature on a translating feed pipe according to the preferred embodiment of the present application.
Figure 4B:
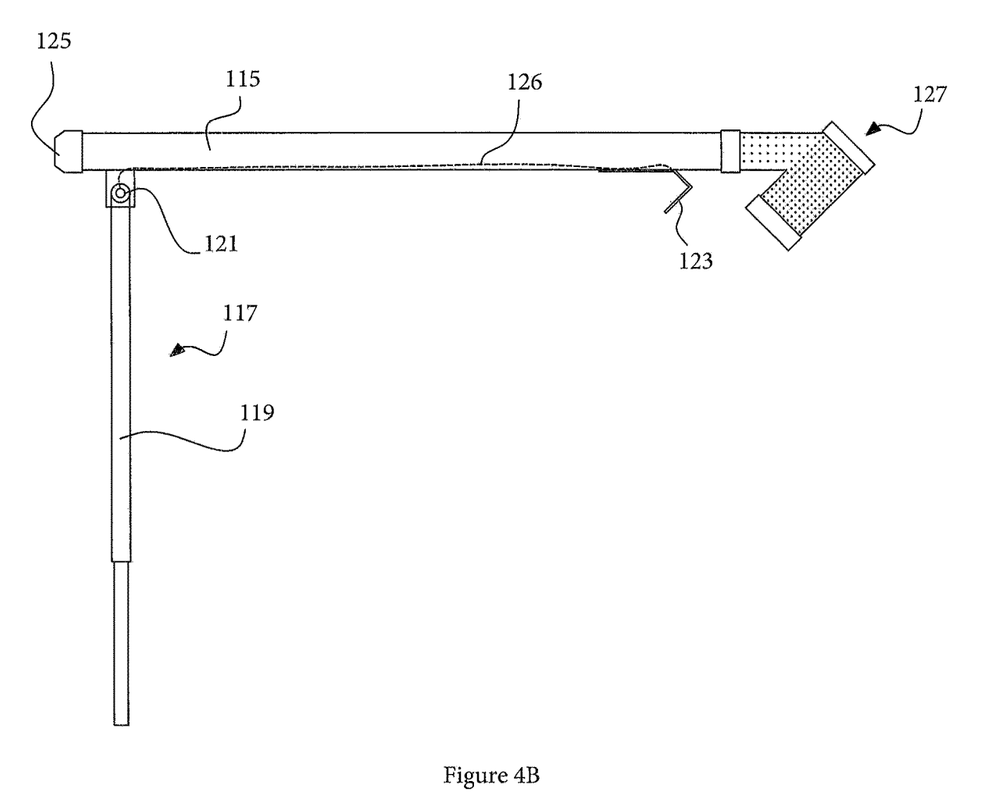
Figure 5:
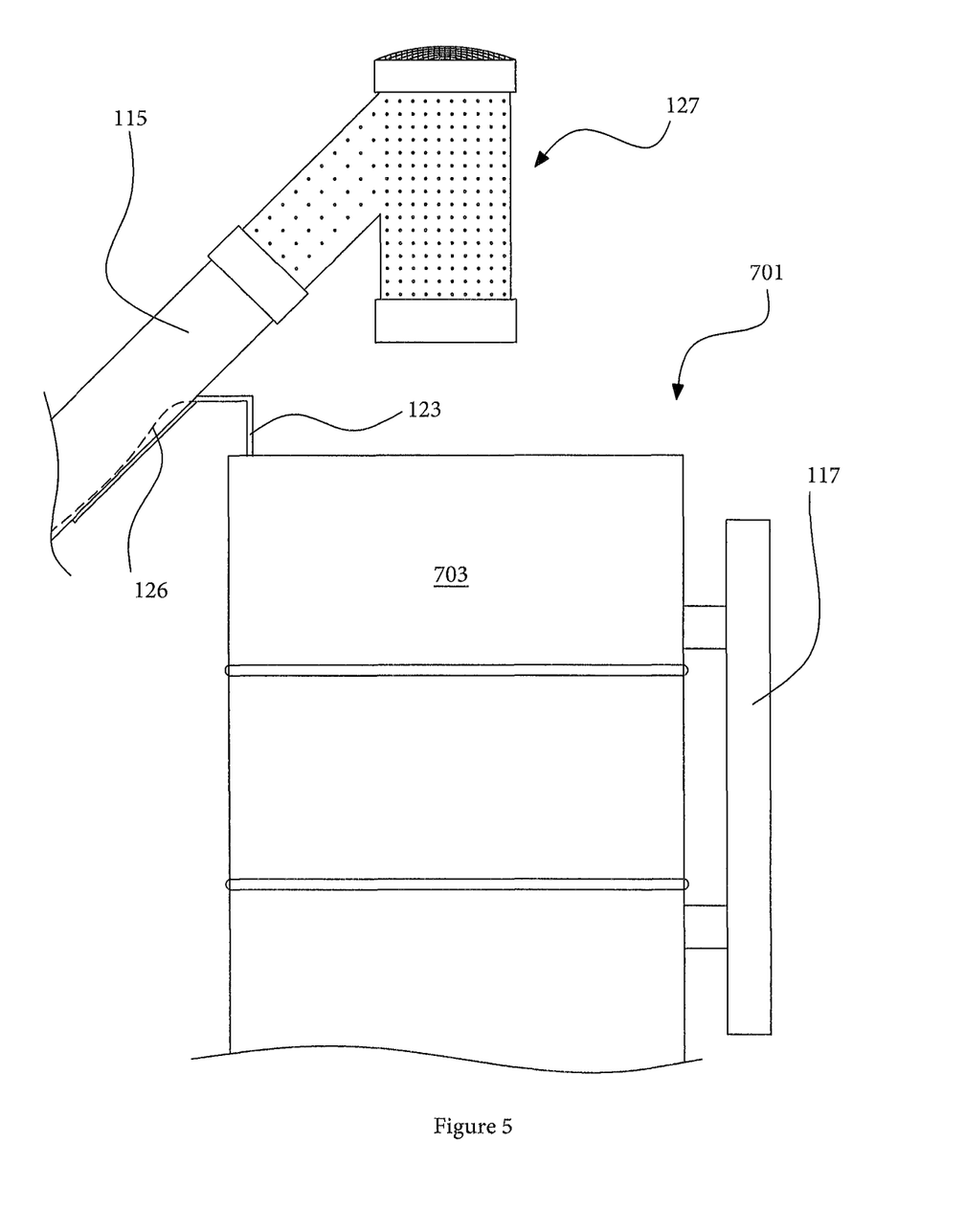
FIG. 5 is an enlarged view of a pipe support hook on the feeder according to the preferred embodiment of the present application.

Referring now also to FIGS. 4A-5, telescoping feed pipe 115 and its attached features are shown. Telescoping feed pipe 115 is slideably supported about fixed feed pipe 113 and translates along the length of fixed feed pipe 113 with respect to the rest of filler system 101. The translating of telescoping feed pipe 115 allows for height adjustment of feed pipe 115 and attached diffuser 127 to place diffuser 127 above an elevated feeder. Telescoping feed pipe 115 preferably contains a folding support 117 and a support hook 123. Folding support 117 preferably comprises a telescoping leg 119 attached to telescoping feed pipe 115 at hinge 121.

Hook support 123 is preferably a planar metal member that is bent into a hook shape and coupled to telescoping feed pipe 115, though other materials such as polymer or composite may be used in alternate embodiments. Telescoping feed pipe 115 preferably also contains a collar 125 that seals telescoping pipe 115 around fixed pipe 113 to prevent air leakage between pipes 115 and 113, thereby ensuring the airflow through pipes 113 and 115 continues to transport corn or other feed grains through filler system 101 towards an elevated wildlife feeder. Collar 125 is preferably a rubber or flexible polymer material. Collar 125 may have a tightening strap or band (not shown) at its end about fixed feed pipe 113 so that, once telescoping feed pipe 115 is brought into position for the operation of filler system 101, the tightening band may be tightened to securely clamp collar 125 to fixed feed pipe 113, preventing telescoping feed pipe 115 from sliding down fixed feed pipe 113.

Telescoping leg 119 pivots about hinge 121 as indicated in FIG. 4C, and preferably consists of least two lengths of metal pipe, the first pipe being secured to hinge 121 and the second pipe being supported about or within the first pipe and translating along the length of the first pipe. The telescoping of leg 119 allows for height adjustment of leg 119 to support translating feed pipe 115. Telescoping leg 119 has a base that is placed upon the ground. The base as shown simply comprises a flat end of telescoping leg 119 without any further support. However, it should be understood that telescoping leg 119 may contain a variety of base or feet designs (not shown), such as sharp protrusions that dig into the ground to keep leg 119 in place, or flat feet with apertures through which tent stakes could be driven into the ground to keep leg 119 in place.

In other embodiments, leg 119 may contain multiple telescoping segments instead of the just one telescoping segment according to the preferred embodiment, or leg 119 may be one solid leg with no telescoping ability. Other alternative embodiments may not have a folding support such as folding support 117 with leg 119 and may instead use a separate leg that does not pivot but rather fits into a recess formed on telescoping feed pipe 115 or otherwise connects to telescoping feed pipe 115. Other embodiments may not have a support leg at all and may rely only on collar 125 and support hook 123 to support telescoping feed pipe 115 in an extended position with the attached diffuser 127 held above an elevated feeder. Finally, other embodiments of filler system 101 may include a folding or removable leg support near the lower end of fixed feed pipe 113, instead of or in addition to inclusion of folding support 117.

Telescoping feed pipe 115 preferably further contains a copper wire 126 that extends from hook support 123 into and along the interior surface of telescoping feed pipe 115 and then back through and outside of telescoping feed pipe 115 at hinge 121. Depending on the design of leg 119 and hinge 121, wire 126 may attach to hinge 121 or may continue along the length of leg 119 down to the base of 119 where it rests upon the ground. For example, if leg 119 is a metal leg that has an electrically conductive contact with a metal hinge 121, wire 126 may end at hinge 121, but if there is not a strong electrical conductive contact between leg 119 and hinge 121, or if hinge 121 does not use sufficiently conductive components, wire 126 may extend down leg 119. The effect of wire 126 is that it creates a ground connection within filler system 101, and within telescoping feed pipe 115 specifically, in order to safely discharge static electricity that may build up as a result of the movement of corn or feed grain through filler system 101. While primarily included to prevent a user from being shocked, wire 126 may also prevent the ignition of grain dust moving through it by prevented arcing inside telescoping feed pipe 115. It will be appreciated that copper wire 126 may be any form material or component that reduces static electricity, including bars, pins, fins, and other externally applied static electricity reduction devices.

Alternative embodiments of filler system 101 may not have a telescoping feed pipe, and may instead utilize only a single fixed feed pipe, or a multi-piece fixed feed pipe, diffuser 127 being attached to the end of the fixed feed pipe. For example, fixed feed pipe 113 could be comprised of multiple connecting segments such that a user could add or remove segments to increase or decrease the length and height of fixed feed pipe 113, and diffuser 127 would attach to the last fixed feed pipe segment. Otherwise alternatively, telescoping feed pipe 115 may be comprised of multiple telescoping segments rather than the single telescoping segment shown, the multiple-telescoping feed pipe allowing for greater range of height for diffuser 127 and allowing the feed pipes of filler system 101 to be collapsed down into a more compact system for transport.

In operation, before depositing corn or feed grain into hopper 103 and before turning on blower 111, a user translates telescoping feed pipe 115 along fixed feed pipe 113 to place diffuser 127 above an elevated wildlife feeder, then secures support hook 123 over the edge of the elevated feeder (see FIG. 5) and tightens the band (not shown) on collar 125. After support hook 123 is secured to the elevated feeder, leg 119 is folded down away from telescoping feed pipe 115 into a generally upright position, and the base of leg 119 is placed upon the ground such that leg 119 supports telescoping feed pipe 115.

Figure 6:
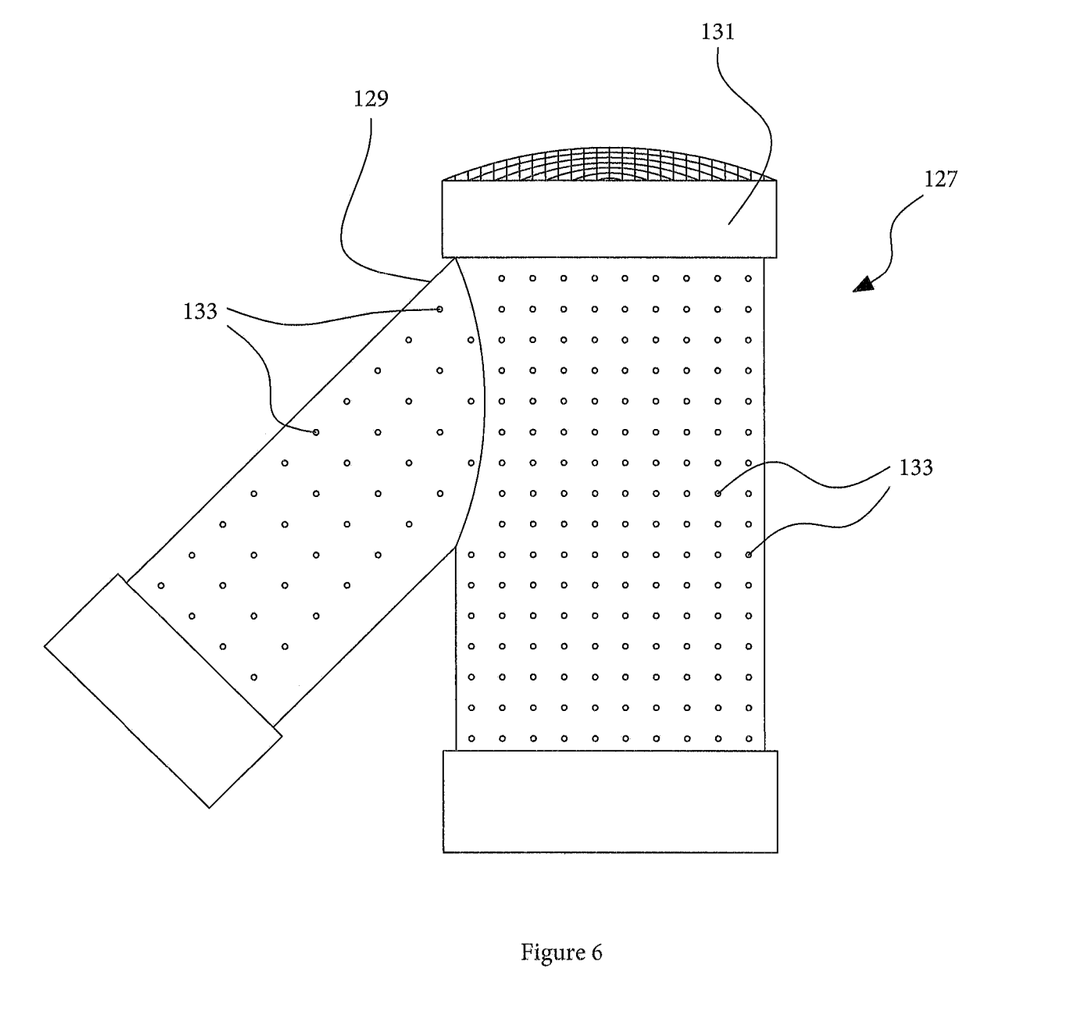
FIG. 6 is an enlarged view of an air diffuser according to the preferred embodiment of the present application.

Referring now also to FIGS. 5 and 6, diffuser 127 of filler system 101 is shown with respect to feeder 701. Certain features of feeder 701 are omitted for clarity. Once the corn, grain, or feed moving through filler system 101 reaches the upper end of telescoping feed pipe 115, it is blown into air diffuser 127. Air diffuser 127 preferably comprises a junction 129 having a two straight pipe segments joined at an angle. Junction 129 is preferably a Y-junction as shown, and the two straight pipe segments act as input segment and output segments, the input segment being connected to telescoping feed pipe 115 and the output segment being supported above an elevated feeder.

Junction 129 being a Y-junction, the input and output segments are joined at an angle such that corn or feed grain travels upwards into diffuser 127 through the angled input segment and then falls out of diffuser 127 through the relatively vertical output segment into an elevated wildlife feeder such as feeder 701. Referring to FIG. 6 specifically, a screened top 131 is fixed at a top end of junction 129 where the input segment and output segment meet to allow air to escape upward out of junction 129. Junction 129 preferably includes a plurality of apertures 133 selectively spaced about a t least a portion of output segment. The apertures are selectively sized, shaped, and positioned to allow air to flow therethrough, but to prevent the wildlife feed from flowing therethrough. The apertures are formed through junction 129 over selected portions of the surface of the output segment and over at least a portion of the input segment. Alternative embodiments of diffuser 127 may not contain any apertures 133 and may instead use only screened top 131 for air diffusion, or may contain apertures 133 instead of screened top 131 for air diffusion. Screened top 131 may include a removable cap (not shown) that attaches to the top of screened top 131 such that a user could prevent airflow through screened top 131 if increased air pressure in diffuser 127 was necessary or desirable. Removable screen top allows diffuser to be quickly and easily cleaned and maintained.

The effect of screened top 131 and apertures 133 is that the forced air from blower 111 may escape from the top and sides of junction 129 rather than being redirected downwards. This allows corn or feed grain to more gently exit the bottom of junction 129 than it otherwise would if screened top 131 or apertures 133 were not present. This prevents the corn or feed grain from being deposited into the elevated feeder with such force that some of the corn, grain, feed, or dust bounces back out of the elevated feeder, thereby creating a more efficient feed filling system.

While filler system 101 may be used with any elevated wildlife feeder, certain commercially available wildlife feeders have simple lids such that a user would still have to climb a ladder or other structure to remove the lid prior to using filler system 101. As such, filler system 101, for the purposes of user safety, is best utilized with an elevated feeder without a lid or with a lid that may be removed without climbing a ladder or other piece of equipment.

Referring now also to FIGS. 7A-7C and 8, a feeder having a lid system well suited for use with filler system 101 or some other filler system is shown. The lower portions of the legs for feeder 701 are not shown in order to preserve margin size, and only two legs are shown in FIG. 7C for the sake of clarity with regards to the handle feature. Feeder 701 generally comprises a drum 703 and a lid 705. Drum 703 may be a barrel specifically designed and sized for use with lid 705 and its operating components, or drum 703 may be part of a commercially available elevated feeder system. As shown, drum 703 is a 55 gallon drum. Many commercially available elevated wildlife feeders utilize common drum sizes such as 30 or 55 gallons to contain the corn, grain, or feed to be spread, and lid 705 and its associated operating components may be easily utilized on or retrofitted to such commercially available feeders.

Referring specifically to FIG. 8, lid 705 contains an inner lip 707 and an outer lip 709 for securing lid 705 to the top of drum 703. Outer lip 709 comprises a complete circular lip sized to fit around the rim of common 55 gallon drums. Inner lip 707 comprises a semicircular lip sized to fit around the rim of common 30 gallon drums. Lips 709 and 707 have diameters large enough to account for slight differences in the diameters of commonly available 30 and 55 gallon drums. Inner lip 707 is semicircular such that a gap is formed between outer lip 709 and the ends of inner lip 707, and the upper edge of drum 703 fits into the gap between outer lip 709 and inner lip 707 when lid 705 is lowered onto drum 703. Similarly, the edge of any open-top container with a circular cross-section with a diameter greater than the diameter of inner lip 707 and less than the diameter of outer lip 709 will fit within the gap between lips 707 and 709. It will be appreciated that lips 707 and 709 may also form concentric circles on lid 705.

Referring now also to FIGS. 7A-7C, it is shown how the design of the operating components for lid 705 allow lid 705 to be compatible with multiple drum sizes. Lid 705 is generally supported upon rod 711, which is coupled to lid 705 by lid bracket 713. Support tube 717 is mounted to the side of drum 703 as shown. Rod 711 is slidably and rotatably supported within support tube 717 such that lid bracket 713 and lid 705 may rotate about the longitudinal axis of support tube 717 with respect to drum 703 and may translate up and down with respect to drum 703. Rod 711 preferably contains a handle 715 mounted to the bottom of rod 711 such that a user may lift up on handle 715 to lift lid 705 off of drum 703, and then may rotate handle 715 in order to rotate lid 705 completely away from above drum 703. This complete rotation of lid 705 away from drum 703 allows a user at ground level to move lid 705 out of the way in order that filler system 101 may dispense corn or feed grain unobstructed into drum 703.

Lid 705 further contains framework 725 to support lid 705 when lid 705 is lifted up off of drum 703. As shown, framework 725 preferably contains an upright rigid segment two angled lengths of cable or chain that hold a turnbuckle 727. Turnbuckle 727 allows adjustment of framework 725 to control the tension on the edge of lid 705 opposite lid bracket 713 and ensures that lid 705 is kept roughly parallel to the top of drum 703 when lifted so that lid 705 may be rotated away from the top of drum 703 without interference. Alternative embodiments of lid 705 may not utilize a framework 725 and turnbuckle 727, and may instead contain bracing around the sides or on the underside of lid 705, or may utilize a material for lid 705 and lid bracket 713 sufficiently strong and stiff such that no bracing is needed.

A chain 719 is attached to lid 705, preferably roughly across from bracket 713. A spring 721 is attached to chain 719 at an upper end of spring 721, and spring 721 has a hook formed at its lower end. A loop 723 may be attached to the legs or other supporting assembly of feeder 701 as shown, or may be attached directly to drum 703 (not shown). Spring 721 hooks into loop 723, thereby cooperating with chain 719 to further secure lid 705 to the top of drum 703 and prevent lid 705 from be blown open by wind.

Support tube 717 preferably may be secured to a variety of drum sizes by fasteners such as bolts or screws, or may be permanently fixed to drum 703 by adhesive or by welding. As such, support tube 717 may be part of a specific feeder such as feeder 701 specifically designed for use with filler system 101, or may be fixed to a variety of commercially available elevated wildlife feeders.

Because, as seen in FIG. 8, lid bracket 713 is located near the clearance between inner lip 707 and outer lip 709, and because lid 705 is supported at lid bracket 713 about the longitudinal axis of support tube 717 which is mounted to the side of drum 703, lid 705 as supported and indexed by support tube 717 is effectively a universal lid that works with a variety of drum sizes without need for modification. As explained above, the diameter of drum 703 is limited by the diameters of inner lip 707 and outer lip 709. As shown, lid 705 is mounted to a 55 gallon drum. However, because the orientation and location of lid 705 is determined by the edge of drum 703 and by the placement of lid bracket 713, lid 705 would work as shown when mounted on a common 30 gallon drum, the 30 gallon drum fitting within inner lip 707. Because support tube 717 can be mounted to a variety of drums, commonly available drums with capacities of less than 30 gallons, or capacities between 30 and 55 gallons, can make use of lid 705 as shown.

Alternative embodiments of feeder 701 may use lids that attach to drum 703 in various different ways. For example, instead of the lifting and rotating lid shown, feeder 701 may utilize a lid that is hingedly supported at bracket 713 such that the lid is still useful on various drum sizes but may be lifted away from drum 703 by lifting only one edge of the lid. In such an embodiment, the edge of the lid could be lifted up by a simple combination of cables and pulleys. For example, a framework could be mounted to drum 703 near the hinge of the lid, and a cable could run from the opening edge of the lid, over a pulley on the framework, and hang down beside drum 703 such that a user could pull down on the cable to open the lid.

Alternatively, feeder 701 could utilize a lid that simply rests atop drum 703, and the lid itself may have an opening hatch or trap door in its center that covers an opening in the lid. The hatch could be opened by an associated operating structure, allowing diffuser 127 to be placed over or seated into the opening in the lid. A trap door could be mounted to the underside of the lid and spring-loaded such that the trap door is normally closed, but opens downward into drum 703 when a lower end of diffuser 127 is lowered onto the trap door. In both the hatch embodiment and the trap door embodiment described, the opening in the lid could be sized and shaped such that diffuser 127 fits closely into the opening and a nearly-airtight seal is formed between the inner edges of the opening and the outer edges of diffuser 127. In such embodiments, drum 703 could have selectively openable vents to allow air to escape and prevent backpressure in the filler system. In this manner, diffuser 127 and drum 703 are configured to operate in combination to support feed pipe 115.

Filler system 101 as disclosed is preferably made of strong, lightweight components that fold away, collapse down, or are otherwise designed to enable easy set-up and take-down of filler system 101 by a user for easy transport. Alternatively, filler system 101 may be configured to be transported in an erected position. For example, filler system 101 could be set up in the back of a pickup truck or otherwise mounted to a mobile platform, thereby not requiring a user to set up filler system 101 at each elevated feeder to be filled.

Figure 9:
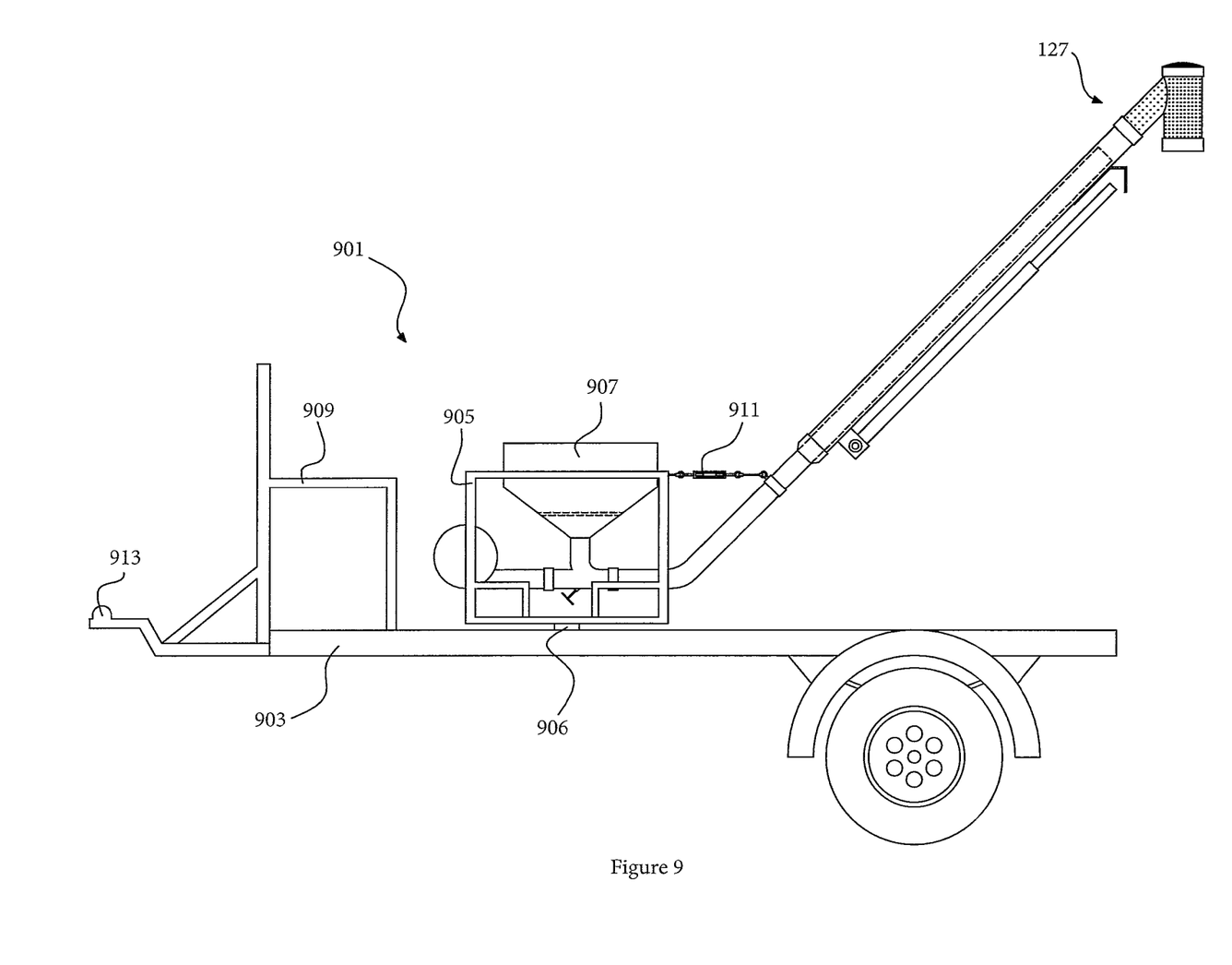
FIG. 9 is a view of a trailer-mounted feeder filler system according to an alternate embodiment of the present application.

Referring now also to FIG. 9, a movable filler system 901 is shown. Except as otherwise specified, filler system 901 should be understood to be similar in form and function to filler system 101. For example, filler system 901 utilizes a hopper, blower, and base junction supported by a base to direct corn, grain, or feed through a fixed pipe and a telescoping pipe into a diffuser. Though not shown, the telescoping feed pipe does contain a wire such as wire 126. Differently though, rather than being mounted to a base 102 which sits upon the ground, filler system 901 is supported by a framework 905. Framework 905 is rotatably mounted to a vehicle and/or trailer 903 via a swivel assembly 906. Swivel assembly 906 could be any swivel assembly suitably for supported filler system 901 upon trailer 903. For example, swivel assembly 906 may include an upright axel mounted upon trailer 903 and a plurality of ball bearings held between tracks on trailer 903 and framework 905. Framework 905 supports the fixed feed pipe of filler system 901, enabling the whole filler system 901 to rotate and swing the fixed and telescoping feed pipes over the edges of trailer 903, thereby swinging the diffuser out over an elevated feed stand and allowing the telescoping feed pipe to be hooked onto the edge of the feeder.

Trailer 903 and framework 905 preferably contain brakes, cranks, latches, pins, and other components (not shown) to allow framework 905 to be secured in place relative to trailer 903 and to prevent filler system 901 from spinning on trailer 903 as trailer 903 is pulled behind a vehicle (or the vehicle is moving). For example, a removable brace could be supported by a pocket or seat formed in the top surface of trailer 903 and the removable brace could secure the fixed feed pipe into position such that the fixed feed pipe points towards the back of trailer 903 during transport. Alternatively, loops or other securing points could be mounted at the lower end of the fixed feed pipe and at the back of trailer 903 such that a cable could be held under tension between the lower end of the fixed feed pipe and the back end of trailer 903, thereby securing system 901 with the feed pipes pointed toward the back of trailer 903. In addition, filler system 901 may include a manual crank system or a motorized actuation system, such as an electric motor or internal combustion engine, to actuate, rotate, and/or lift filler system 901.

A turnbuckle 911 or some other adjustable tension component preferably is attached between framework 905 and the fixed feed pipe such that the support of the feed pipes of filler system 901 may be adjusted. Alternative embodiments of filler system 901 may not utilize turnbuckle 911 or any other adjustable tension member and may instead utilize a rigid member to attach the fixed feed pipe to framework 905. Depending on the height and proximity of an elevated feed stand relative to filler system 901, it may be necessary to lower the telescoping leg of the folding support. Alternatively, filler system 901 may not contain the folding support or any other leg supports for the fixed or telescoping feed pipes, and may use only framework 905 and the support hook on the translating feed pipe to support filler system 901 upon an elevated feeder.

Because filler system 901 is mounted to trailer 903 rather than being set-up and taken-down by hand, filler system 901 may use a hopper of a much greater capacity than hopper 103. As shown in FIG. 9, filler system 901 utilizes a large capacity hopper 907. The size and shape of large capacity hopper 907 may vary depending on design preference and are limited only by the shape and weight-bearing capabilities of framework 905. Trailer 903 may also contain a shelf 909 near its front end such that several bags of corn or wildlife feed may be carried about on trailer 903 and placed near hopper 907. A user therefore may easily pour bags of feed into large capacity hopper 907. A hitch receiver 913 at the front end of trailer 903 enables a user to attach trailer 903 to an all-terrain vehicle (AN) or a passenger vehicle and pull filler system 901 around an area of land to several different elevated feeders, such that a user may refill many feeders relatively quickly and easily.

It is apparent that a system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description and claims. Although the present embodiments are shown above, they are not limited to just these embodiments, but are amenable to various changes and modifications without departing from the spirit thereof.

I claim:

1. A filler system for filling an elevated wildlife feeder with wildlife feed, the filler system comprising:
   a base;
   a base junction coupled to the base, the base junction having a first input port, a second input port, and an output port;
   a hopper coupled to the first input port of the base junction;
   a blower coupled to the second input port of the base junction;
   a feed pipe having an upper end and a lower end, the lower end being coupled to the output port of the base junction; and
   a diffuser coupled to the upper end of the feed pipe, the diffuser comprising:
      an input segment having a plurality of apertures selectively spaced about at least a portion of the input segment, the apertures being selectively sized, shaped, and positioned to allow air to flow therethrough, but to prevent the wildlife feed from flowing therethrough;
      an output segment having a plurality of apertures selectively spaced about at least a portion of the output segment, the apertures being selectively sized, shaped, and positioned to allow air to flow therethrough, but to prevent the wildlife feed from flowing therethrough;
      a top portion; and
      a screen member coupled to the top portion.

2. The filler system of claim 1, further comprising:
   a fixed airflow damper member mounted inside the base junction.

3. The filler system of claim 1, further comprising:
   an adjustable airflow damper located at least partially within the base junction, the adjustable airflow damper comprising:
      a rigid member mounted within the base junction; and
      an adjustable member movable relative to the rigid member within the base junction for selectively restricting the flow of air from the blower.

4. The filler system of claim 1, further comprising:
   a screen removably disposed within the hopper, the screen having a pattern of openings selectively sized, shaped, and positioned, such that the wildlife feed may pass therethrough into the hopper, but material larger than the openings is restricted from passing therethrough into the hopper.

5. The filler system of claim 1, wherein the feed pipe comprises:
   a fixed pipe section coupled to the output port of the base junction; and
   a telescoping pipe section slidably mounted about the fixed pipe section, so as to translate axially along the fixed pipe section, the telescoping pipe section being coupled to the diffuser.

6. The filler system of claim 5, further comprising:
   a support hook coupled near the upper end of the telescoping feed pipe for supporting the diffuser relative to the wildlife feeder.

7. The filler system of claim 1, further comprising:
   a support leg for supporting the feed pipe.

8. The filler system of claim 7, wherein the support leg is an adjustable leg assembly.

9. The filler system of claim 1, further comprising:
   a static-discharge wire disposed within the interior of the feed pipe, the static-discharge wire being conductively coupled to ground.

10. A wildlife feeder system, comprising:
    an elevated wildlife feeder, comprising:
       a drum elevated by a plurality of legs;
       an upright tube coupled to a side of the drum;
       a rod having an upper rod end and a lower rod end, the rod being translatably supported within the upright tube;
       a lid bracket coupled to the upper rod end; and
       a lid coupled to the lid bracket, the lid being operable between a closed position in which the lid covers the top of the drum and an open position in which lid at least a portion of the top of the drum is exposed;
       wherein at least a portion of the lid is moved between the open position and the closed position by movement of the rod; and
    a filler system, comprising:
       a base;
       a base junction coupled to the base, the base junction having a first input port, a second input port, and an output port;
       a hopper coupled to the first input port of the base junction;
       a blower coupled to the second input port of the base junction;
       a feed pipe having an upper end and a lower end, the lower end being coupled to the output port of the base junction; and
       a diffuser coupled to the upper end of the feed pipe, the diffuser comprising:
       a diffuser coupled to the upper end of the feed pipe, the diffuser comprising:
          an input segment having a plurality of apertures selectively spaced about at least a portion of the input segment, the apertures being selectively sized, shaped, and positioned to allow air to flow therethrough, but to prevent the wildlife feed from flowing therethrough;
          an output segment having a plurality of apertures selectively spaced about at least a portion of the output segment, the apertures being selectively sized, shaped, and positioned to allow air to flow therethrough, but to prevent the wildlife feed from flowing therethrough;
          a top portion; and
          a screen member coupled to the top portion;
       wherein the lid and the drum are configured to support the feed pipe when the lid is in the open position.

11. The wildlife feeder system of claim 10, further comprising:
    a framework coupled to the lid for adjusting tension on the lid.

12. The filler system of claim 10, wherein the lid comprises:
    a plurality of lips formed on an underside of the lid; and
    a gap formed between adjacent lips, the gaps being selectively sized and shaped to receive the top edges of drums of differing diameters.

13. The filler system of claim 10, wherein the base junction contains an adjustable airflow damper comprising:
    a rigid member mounted within the base junction; and an adjustable member movable relative to the rigid member within the base junction for selectively restricting the flow of air from the blower.

14. The filler system of claim 10, further comprising:
a support hook coupled near the upper end of the telescoping feed pipe for supporting the diffuser relative to the wildlife feeder.

15. A system for filling an elevated wildlife feeder with wildlife feed, the system comprising:
a movable vehicle having a top surface, a back end, and a front end; and
a filler system, comprising:
   a base carried by the top surface of the vehicle;
   a base junction coupled to the base, the base junction having a first input port, a second input port, and an output port;
   a hopper coupled to the first input port of the base junction;
   a blower coupled to the second input port of the base junction;
   a feed pipe having an upper end and a lower end, the lower end being coupled to the output port of the base junction; and
   a diffuser coupled to the upper end of the feed pipe, the diffuser comprising:
      an input segment having a plurality of apertures selectively spaced about at least a portion of the input segment, the apertures being selectively sized, shaped, and positioned to allow air to flow therethrough, but to prevent the wildlife feed from flowing therethrough;
      an output segment having a plurality of apertures selectively spaced about at least a portion of the output segment, the apertures being selectively sized, shaped, and positioned to allow air to flow therethrough, but to prevent the wildlife feed from flowing therethrough;
      a top portion; and
      a screen member coupled to the top portion.

16. The filler system of claim 15, further comprising:
a framework coupled to the base, the framework being rotatably coupled to the top surface of the trailer by a swivel assembly, whereby the filler system is rotated relative to vehicle, such that the diffuser is aligned with the wildlife feeder.

17. The filler system of claim 15, wherein the base junction contains an adjustable airflow damper comprising:
a rigid member mounted within the base junction; and
an adjustable member hingedly attached to the rigid member within the base junction for selectively restricting the flow of air from the blower.

* * * * *